United States Patent
DeBaker et al.

(10) Patent No.: US 10,107,185 B2
(45) Date of Patent: Oct. 23, 2018

(54) TURBOCHARGER BOOST CONTROL SYSTEM AND METHOD

(71) Applicant: Company23, Rothschild, WI (US)

(72) Inventors: Chad DeBaker, Minneapolis, MN (US); Ryan Mattson, Rothschild, WI (US)

(73) Assignee: Company23, Rothschild, WI (US)

( * ) Notice: Subject to any disclaimer, the term of this patent is extended or adjusted under 35 U.S.C. 154(b) by 146 days.

(21) Appl. No.: 15/173,279

(22) Filed: Jun. 3, 2016

(65) Prior Publication Data

US 2016/0356209 A1    Dec. 8, 2016

Related U.S. Application Data

(60) Provisional application No. 62/171,457, filed on Jun. 5, 2015.

(51) Int. Cl.
| *F02B 37/18* | (2006.01) |
|---|---|
| *F02D 41/00* | (2006.01) |
| *F02D 41/26* | (2006.01) |
| *F02D 41/20* | (2006.01) |

(52) U.S. Cl.
CPC ........ *F02B 37/186* (2013.01); *F02D 41/0007* (2013.01); *F02D 41/266* (2013.01); *F02D 2041/2027* (2013.01); *Y02T 10/144* (2013.01)

(58) Field of Classification Search
CPC .. F02B 37/183; F02B 37/186; F02D 41/0007; F02D 41/266; F02D 2041/2027
USPC ................. 701/102, 115; 123/559.2, 564
See application file for complete search history.

(56) References Cited

U.S. PATENT DOCUMENTS

| 4,140,087 A * | 2/1979 | Daumer ............... F02D 41/182 |
| | | 123/486 |
| 4,163,282 A * | 7/1979 | Yamada ............... F02D 41/263 |
| | | 123/406.65 |
| 2004/0128996 A1* | 7/2004 | Klingseis .............. F02B 37/186 |
| | | 60/602 |
| 2010/0122691 A1* | 5/2010 | Xiao ...................... F02D 41/20 |
| | | 123/490 |
| 2015/0101581 A1* | 4/2015 | Karacic .............. F02D 41/0007 |
| | | 123/568.21 |

\* cited by examiner

*Primary Examiner* — Erick Solis
(74) *Attorney, Agent, or Firm* — Schwegman Lundberg & Woessner, P.A.

(57) ABSTRACT

A boost-control valve in a turbocharger system can be configured to update a wastegate status. The wastegate can discharge exhaust gases from a turbine chamber in the turbocharger, for example based on a pressure detected in a compressor chamber of the turbocharger. In an example, a processor circuit can be coupled to an OEM ECU, and can receive a first control signal from an OEM ECU. The first control signal can include a PWM signal having a first frequency and a first duty cycle. The processor circuit can generate a second control signal for controlling the boost-control valve. The second control signal can have the same first duty cycle and a different second frequency. In an example, the different second frequency is greater than the first frequency. In an example, the second control signal includes a DC signal having a variable amplitude.

19 Claims, 11 Drawing Sheets

TURBOCHARGER BOOST CONTROL SYSTEM AND METHOD

CLAIM OF PRIORITY

This application claims the benefit of priority under 35 U.S.C. § 119(e) of U.S. Provisional Patent Application Ser. No. 62/171,457, filed on Jun. 5, 2015, which is herein incorporated by reference in its entirety.

BACKGROUND

A turbocharger for an internal combustion engine can include an input side and an output side. The input side includes a turbine chamber that receives exhaust gas from the engine. A turbine in the turbine chamber turns when exhaust gases from the engine flow through the turbine chamber. The output side includes a compressor chamber that receives fresh air. A compressor blade in the compressor chamber is coupled to the turbine by way of a shaft, and the compressor blade turns when the turbine turns. Generally, a speed or load of the engine determines how quickly the turbine spins. As a volume or velocity of exhaust gases increases, such as at higher engine speeds, the turbine and the compressor blade turn more quickly.

A turbocharger can include a wastegate in the turbine chamber. A wastegate is configured to selectively bypass or discharge some exhaust gasses from the turbine chamber, thereby decreasing a pressure in the turbine chamber, and thus reducing a turbine velocity. A wastegate can be controlled by a compressor manifold pressure, sometimes referred to as boost pressure. When the boost pressure exceeds some specified maximum pressure, the wastegate can open a door in the turbine chamber to release gas from the chamber.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
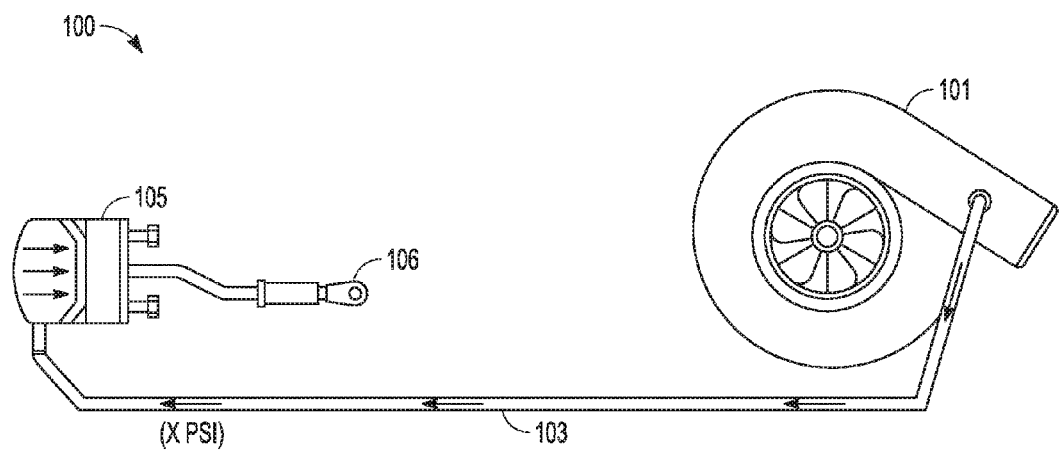
FIG. 1 illustrates generally an example of a turbocharger system with a compressor and a wastegate actuator.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Further, in this document, the terms "including" and "in which" are used as the plain-English equivalents of the respective terms "comprising" and "wherein."

An engine control unit, or ECU, is a type of circuit that controls multiple features of an engine to optimize the engine's performance. In an example, an ECU controls multiple actuators on or associated with an internal combustion engine to optimize the engine's performance. In an example, an ECU monitors or receives multiple engine or vehicle sensor signals, processes the sensor signals, and then adjusts one or more engine characteristics based on the sensor signals. In an example, an ECU can process or interpret sensor signal data using multidimensional performance maps (e.g., lookup tables), algorithms, or other pre-defined relationships to determine which engine characteristics to adjust and by what amount. Before ECUs were commonplace control mechanisms for engines, operating parameters such as an air-fuel mixture, ignition timing, and idle speed were mechanically set and dynamically controlled by mechanical or pneumatic means.

Multiple different sensors can be used to provide input signals to an ECU. An accelerometer can be configured to provide acceleration information to the ECU. A thermometer can be configured to provide temperature information to the ECU, such as including external or ambient air temperature information, information about a temperature of one or more liquids in or for use by an engine, or information about an input or exhaust air temperature. An engine load sensor can provide load information, or a pressure sensor can provide information about a pressure in one or more chambers or manifolds of an engine. One or more sensors associated with an engine turbocharger can provide information to or use information from the ECU.

In an example, an engine includes a turbocharger. The turbocharger can include an input side and an output side. At the input side, there is a turbine chamber with a turbine that turns when exhaust gases from the engine flow through the turbine chamber. At the output side, a compressor blade turns in a compressor chamber. The compressor can be driven by a shaft that is coupled to the turbine in the turbine chamber. Generally, a speed or load of an engine determines how quickly a turbine spins in a turbocharger. As a volume or velocity of exhaust gases increases, such as at higher engine speeds, the turbine can turn more quickly. Exhaust gases exit the turbine chamber via an exhaust outlet.

Low pressure air, such as ambient air, is drawn into the compressor chamber via an inlet as the compressor blade spins. The air is compressed by the compressor blade as the air is directed into the engine's input air conduit. Using the compressor, a relatively high velocity and low pressure airstream is converted into a relatively low velocity and high pressure airstream. An intercooler, or charged air cooler, can be provided to cool hot, high pressure air in the input air conduit after the compressor, such as before the air reaches a combustion chamber of the engine.

A turbocharger system can be used to change an amount of air that is available for combustion at the beginning of a piston cycle. Depending on multiple factors, such as air temperature or pressure, a different stoichiometric mix of fuel and air can be used to maximize combustion efficiency for a given engine cycle. A turbocharger can be used to more accurately reach an input air target, such as to improve an air and fuel mixture used in the engine system.

At high engine speeds, more exhaust gas is produced, and the turbine can over-speed and thus over-boost an engine. To prevent such over-boosting, a wastegate can be provided to discharge unwanted pressure from the turbine chamber. This discharging of excess air is sometimes referred to as pressure bleeding or pressure shunting. In an example, a wastegate can include a movable door in a sidewall of the turbine chamber. A wastegate actuator can be provided to control operation of the wastegate door.

In an example, a wastegate actuator includes a spring-loaded diaphragm. The spring tension can be specified or tuned to a tension that is selected according a desired performance characteristic of the engine or the turbocharger. The wastegate diaphragm is movable in a wastegate actuator chamber in response to a pressure signal that indicates a pressure or other performance characteristic of the compressor or boost side of the turbocharger. The pressure signal is communicated to the wastegate actuator chamber by way of a wastegate conduit or tube that provides fluid (e.g., gas) communication between the wastegate actuator chamber and the compressor chamber.

When pressure in the compressor chamber reaches a specified maximum pressure level, the wastegate actuator is actuated and in turn the wastegate door can open to release gas from the turbine chamber. In an example, a wastegate actuator is configured such that when pressure on a compressor side of a turbocharger exceeds 10 psi (e.g., as a result of increased exhaust gas flow from increased engine speed), then the compressor chamber pressure actuates the wastegate actuator, thereby causing the wastegate door to open and release at least a portion of the gas in the turbine chamber. The gas released from the turbine chamber is permitted to exit the turbocharger and thus it effectively bypasses the turbine. Turbine assemblies that include a wastegate can be made smaller and can provide a better response, while maintaining a suitably high power output, such as compared to turbine assemblies without wastegates.

Generally, a wastegate conduit communicates pressure information from a compressor side of the turbocharger to the wastegate actuator. However, in an example, a wastegate conduit can be configured to provide fluid (e.g., gas) communication between a wastegate actuator chamber and a turbine chamber. In such an example, pressure information from the turbine side of the turbocharger is used to control operation of the wastegate.

FIG. 1 illustrates generally an example of a turbocharger system 100 with a compressor 101 and a wastegate actuator 105. The wastegate actuator 105 receives a gas pressure signal (e.g., at X psi) from a compressor chamber of the compressor 101 of a turbocharger via a wastegate conduit 103. In an example, the wastegate actuator 105 includes a diaphragm that is spring loaded. A wastegate actuator arm 106 moves in correspondence with the diaphragm, such as in response to changes in pressure at the compressor chamber of the compressor 101. The wastegate actuator arm 106 is coupled to a wastegate door inside of the turbine chamber of the turbocharger to selectively release gas from the turbine chamber.

An electromechanical device, such as a solenoid, can be used to modulate a turbine chamber pressure by balancing a pressure distribution between the wastegate chamber and the compressor chamber. The solenoid can include a two-port device provided substantially in parallel with a wastegate actuator (see, e.g., FIGS. 2 and 3), or the solenoid can be a three-port device that is provided serially between the compressor chamber and the wastegate chamber (see, e.g., FIGS. 4 and 5). When the solenoid is off, exhaust gases can be directed to the wastegate chamber by default. If an exhaust gas pressure in the compressor chamber exceeds a specified maximum pressure level (e.g., 10 psi), and the solenoid is off, then the wastegate door opens (e.g., by mechanically displacing the spring and the diaphragm in a wastegate actuator's chamber) and the excess pressure (e.g., over 10 psi) can be discharged.

Figure 2:
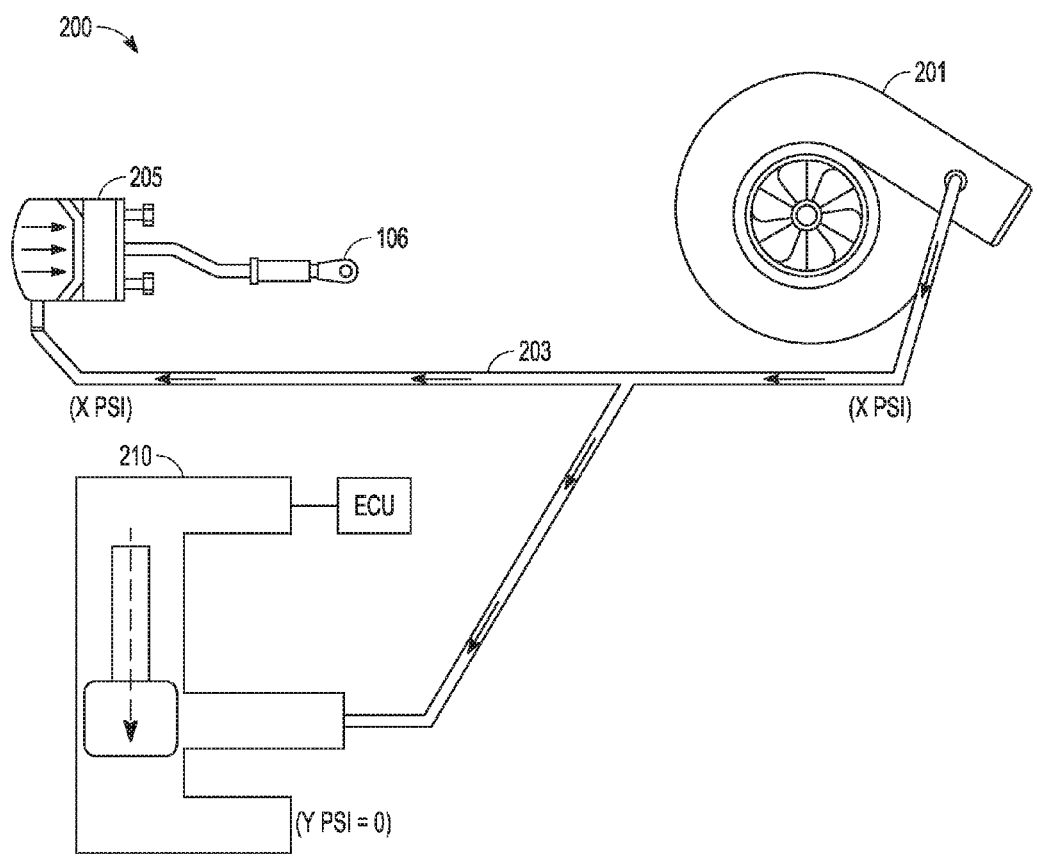
FIG. 2 illustrates an example of a turbocharger system including a compressor, a wastegate actuator, and a two-port solenoid valve in a first configuration.
Figure 4:
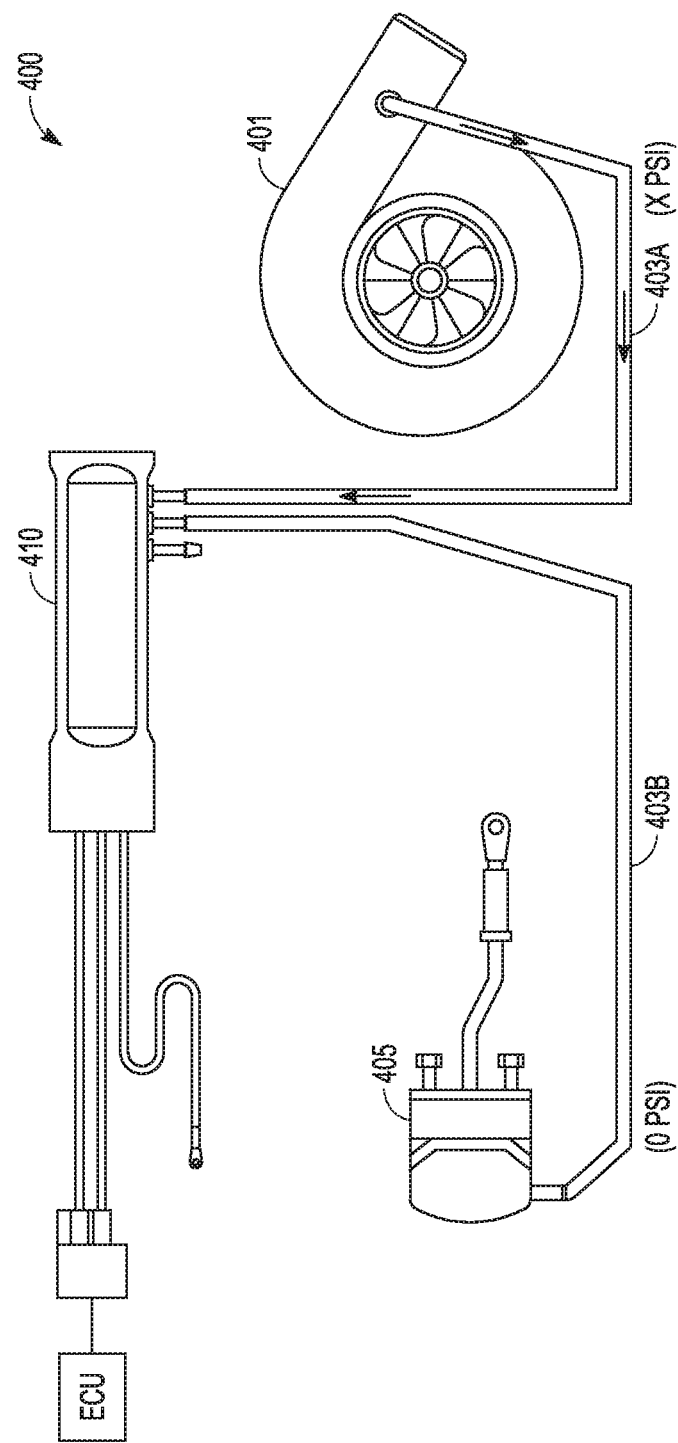
FIG. 4 illustrates an example of a turbocharger system including a compressor, a wastegate actuator, and a three-port solenoid valve in a first configuration.

FIG. 2 illustrates an example 200 of a turbocharger system including a compressor 201, a wastegate actuator 205, and a two-port solenoid valve 210 in a first configuration. The two-port solenoid valve 210 can be provided substantially in parallel with a wastegate conduit 203. In the example of FIG. 2, the two-port solenoid valve 210 is off and substantially all of the compressor chamber gas in the wastegate conduit 203 is provided to the wastegate actuator. In the example of FIG. 4, the three-port solenoid valve 310 is off, and substantially none of the compressor chamber gas is released.

When a solenoid is on, pressure in the compressor chamber can rise above a specified maximum pressure level. Gas contributing to the compressor chamber pressure above the maximum would normally be discharged after actuating the wastegate. However, when the solenoid is in the on position, the excess gas can be discharged or shunted from the wastegate conduit before the gas reaches the wastegate chamber. That is, the solenoid can release pressure in the wastegate conduit line, and pressure on the boost or compressor side can be maintained or increased. A portion of the gas that would have otherwise been discharged through the wastegate door is instead discharged through a port in the solenoid.

Figure 3:
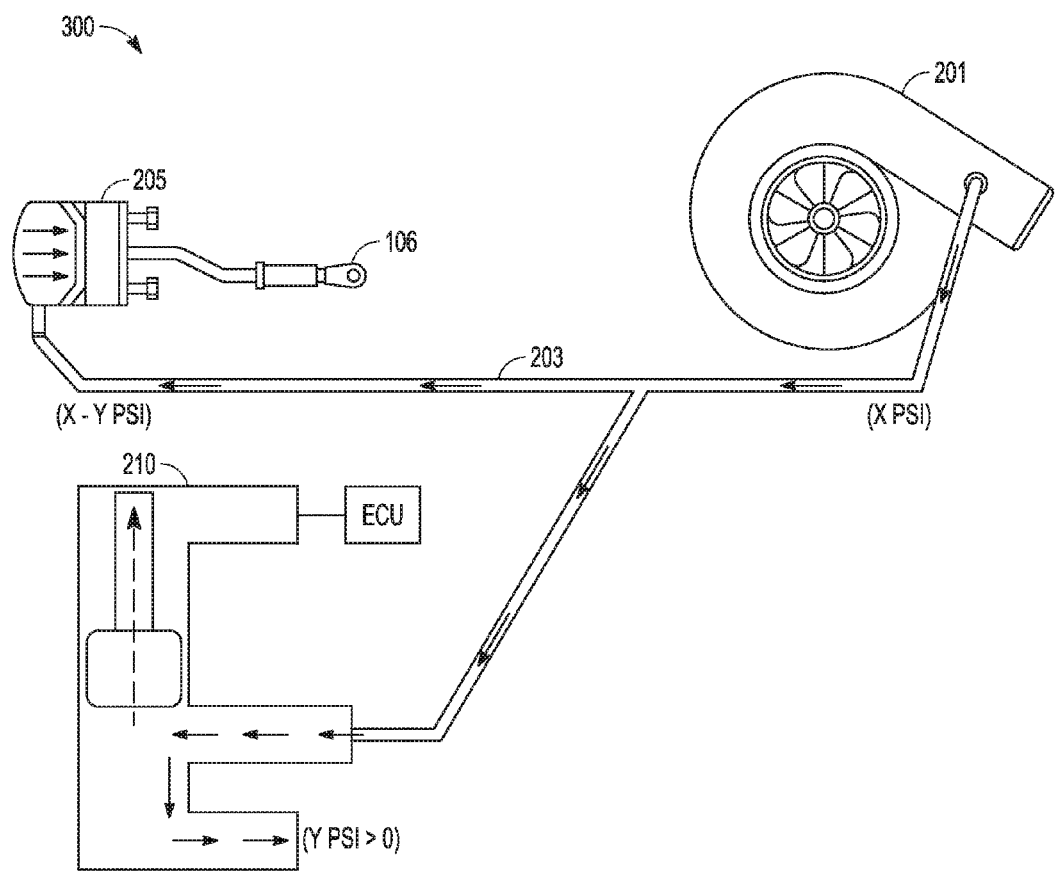
FIG. 3 illustrates an example of a turbocharger system including a compressor, a wastegate actuator, and a two-port solenoid valve in a second configuration.

FIG. 3 illustrates an example 300 of the turbocharger system from FIG. 2, including the two-port solenoid valve 210 in a second configuration. In the example of FIG. 3, the two-port solenoid valve 210 is on and at least a portion of the compressor chamber gas in the wastegate conduit 203 is provided to the wastegate actuator 205. For example, if the wastegate conduit 203 receives a pressure signal having X psi from the compressor 201, then the two-port solenoid valve 210 can bleed or discharge a portion of the received pressure signal, such as including a Y psi signal. A remaining portion of the original pressure signal from the compressor, such as having pressure X-Y psi, can thus be provided at the wastegate actuator 205.

Figure 5:
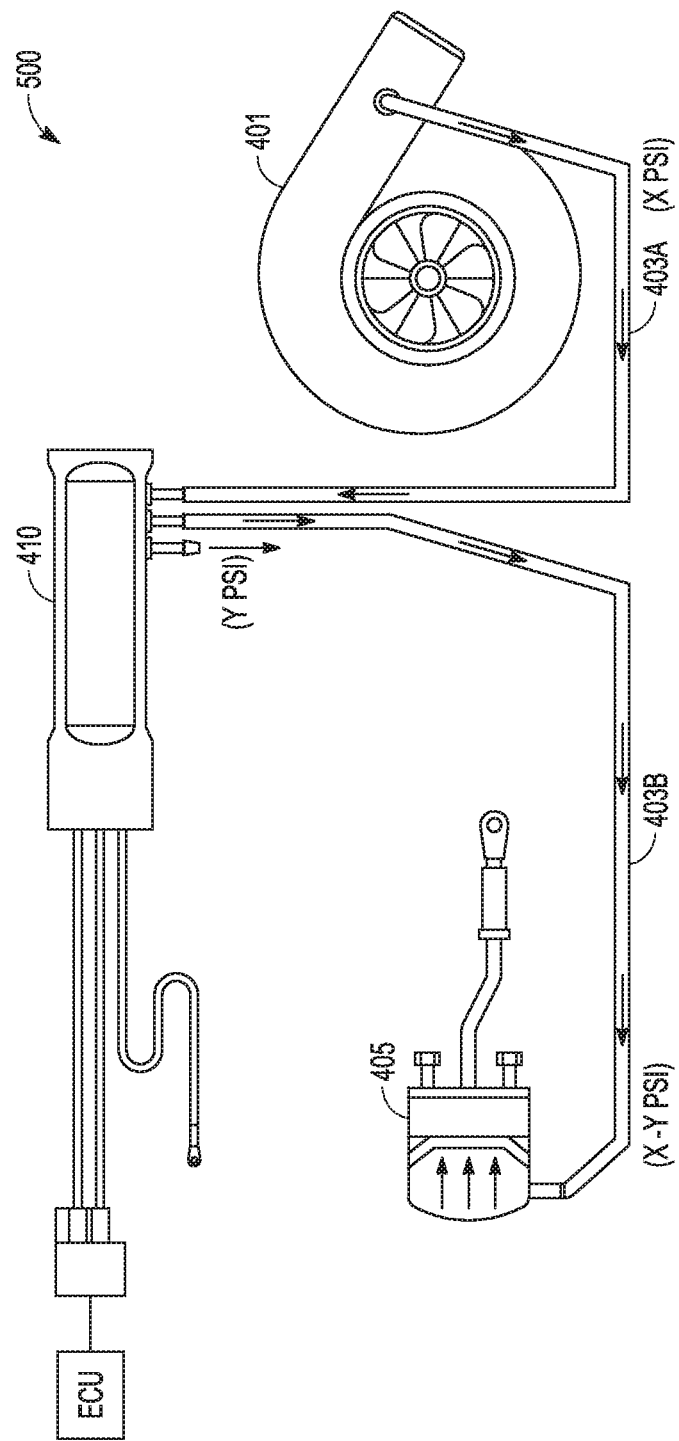
FIG. 5 illustrates an example of a turbocharger system including a compressor, a wastegate actuator, and a three-port solenoid valve in a second configuration.

FIGS. 4 and 5 illustrate examples 400 and 500, respectively, of a turbocharger system with a three-port solenoid valve 410. The example 400 includes a compressor 401 in fluid communication with a wastegate actuator 405 via first and second wastegate conduits 403A and 403B, and via the three-port solenoid valve. In FIG. 4, the three-port solenoid valve 410 is in a first or off configuration. In this example, the compressor chamber gas in the first wastegate conduit 403A is inhibited from passing to the wastegate actuator 405 by the three-port solenoid valve 410. That is, when the three-port solenoid valve 410 is off, substantially none of the compressor chamber gas is released.

In the example 500 of FIG. 5, the three-port solenoid valve 410 is in a second or on configuration. In this example, at least a portion of the compressor chamber gas in the first wastegate conduit 403A is released from the solenoid valve and/or passed to the wastegate actuator 405. In the examples of FIGS. 3 and 5, the two-port and three-port wastegate solenoids, respectively, are on, and a portion of the compressor chamber gas in the wastegate conduit is released. For example, if pressure in the wastegate conduit is X psi, and gas at Y psi is released, then a remaining gas pressure X-Y is provided at the wastegate actuator.

In an example, a problem to be solved includes using or modifying a turbocharger with an OEM ECU. The OEM ECU can have a pre-set, fixed frequency or clock rate, such as 10 Hz or 14 Hz. In some examples, a wastegate can pulsate or flutter because a solenoid valve isn't cycling quickly enough at 10 Hz or 14 Hz to meet a demand of the vehicle. In an example, a solution includes using a microcontroller or other processor circuit to increase the ECU's signal frequency while maintaining a duty cycle of the ECU's signal. By increasing the frequency, the signal that controls the solenoid can be effectively smoothed, thereby reducing detectable pulsation or flutter of the wastegate door, and reducing fluctuations in compressor and turbine chamber pressures.

In some examples, an OEM ECU can be replaced with a higher frequency ECU. However, ECUs are generally expensive and include features, such as emission control systems, that are tuned for a particular engine. A replacement ECU may not include all of such systems. As described herein, an additional processor circuit or microcontroller can be configured to receive a turbocharger solenoid control signal from an OEM ECU and then convert that solenoid control signal into a higher frequency signal. By retaining and using information from an OEM ECU, benefits or other functions of the OEM ECU (e.g., unrelated to turbocharger performance) can be maintained, and solenoid cycle time can be reduced to improve or enhance turbocharger performance. In an example, the processor circuit or microcontroller increases a turbocharger control signal from an OEM ECU frequency to at least 20 Hz.

In an example, an ECU can provide an electronic control signal to operate a solenoid. The control signal can be an electrical or other signal that has one or more characteristics that vary with time, such as frequency, amplitude, phase, or other characteristic. In an example, the control signal includes a pulse-width modulated signal, or PWM signal. The PWM signal is generally a square wave signal that has a frequency and two signal components per cycle. The two signal components provide a relative duration over each cycle length that corresponds to an "on" portion of the signal and an "off" portion of the signal. The frequency and relative duration of the pulses in the PWM signal determine whether the solenoid is on or off, and the on/off state of the solenoid determines an amount of air that is bled or discharged from the wastegate conduit. As a result, the PWM signal provided to the solenoid influences when a wastegate door is opened to release pressure from the turbine chamber (e.g., to reduce turbocharger boost), or when the wastegate door is closed to build pressure in the turbine chamber and thereby in the compressor chamber (e.g., to increase turbocharger boost). The ECU produces the PWM signal based on multiple variables, based on a look-up table, or based on a specified algorithm, among other ways.

A PWM signal duty cycle indicates a relative percentage of time or duration that the solenoid is open. The solenoid has mass, however, and there are physical limits to how quickly it can move between opened and closed positions. A solenoid may be rated according to an operating frequency that indicates a number of times the solenoid can change position in 1 second. Solenoids for turbocharger applications typically function in a range of about 10-30 Hz. The qualifiers "opened" and "closed", as used herein, can refer to partially opened or partially closed positions, unless specified otherwise. Solenoids can be configured to be normally opened or normally closed. That is, in the absence of a control signal, a solenoid can have a default or normal position that is opened or closed.

In an example, a duty cycle of a PWM signal represents a percentage of time that the solenoid is "on", or configured to discharge pressure from the wastegate conduit. A duty cycle of 50% can indicate that a solenoid is on for 50% of the time in each cycle. In an example, an ECU provides a 10 Hz signal (10 cycles per second). The PWM signal corresponding to this ECU has a cycle length of 0.1 seconds. At a duty cycle of 50%, a first cycle of the PWM signal has equal first and second signal portions corresponding respectively to the solenoid being on and off. That is, for each cycle of the PWM signal at 10 Hz and 50% duty cycle, the solenoid is on for 0.05 seconds and the solenoid is off for 0.05 seconds.

At a duty cycle of 10%, a second cycle of a PWM signal can have a first signal portion that is 0.01 seconds long and a second signal portion that is 0.09 seconds long. That is, for each cycle of the PWM signal at 10 Hz and 10% duty cycle, the solenoid is on for 0.01 seconds and is off for 0.09 seconds. At a duty cycle of 100%, a third cycle of the PWM signal includes only a single pulse that is of equal duration to the cycle length, or 0.1 seconds. That is, for each cycle of the PWM signal at 10 Hz and 100% duty cycle, the solenoid is held in the on position for 0.1 seconds. Whenever the solenoid is on, boost pressure in the compressor chamber can increase, excess gas can be discharged from the wastegate conduit, and the wastegate door can be delayed from opening.

In an example, a desired boost curve can be provided, such as by an ECU, by an after-market processor, or by a user. The boost curve can include information about a desired boost characteristic for the turbocharger. For example, the desired boost curve can indicate a target pressure at the compressor side of the turbocharger as a function of time, or as a function of one or more other variables. In an example, a boost characteristic includes a desired or target pressure for the compressor chamber given some engine load, temperature, altitude, or other characteristic, or the boost characteristic can include a desired boost result. For example, the boost characteristic can include a desired compressor blade rotational velocity or a compressor manifold output volume.

Figure 6:
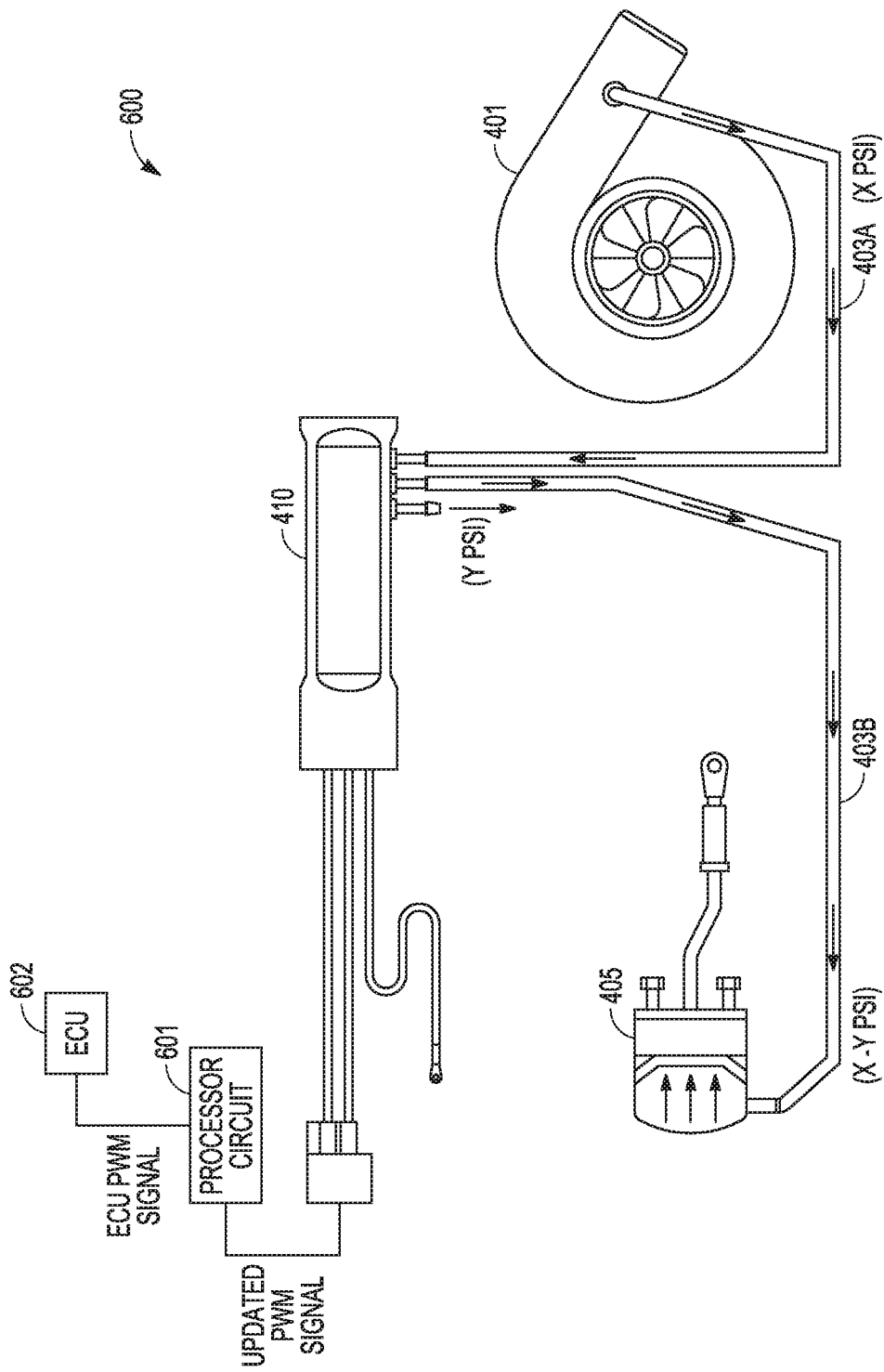
FIG. 6 illustrates generally an example of the turbocharger system of FIG. 5 with a processor circuit and an ECU.

FIG. 6 illustrates generally an example 600 of the turbocharger system from FIG. 5 with a processor circuit 601 and an ECU 602. The processor circuit 601 can receive or intercept a PWM signal from the ECU 602. A PWM signal originating or received from an ECU is sometimes referred to herein as an "ECU PWM signal". The processor circuit 601 can identify a frequency, duty cycle, amplitude, or other characteristic of the ECU PWM signal. The processor circuit can be configured to use one or more characteristics from the ECU PWM signal received from the ECU 602 to generate an updated time-varying control signal for operating a turbocharger solenoid, such as a the three-port solenoid valve 410. The updated time-varying control signal can be an electrical or other signal that has one or more characteristics that vary with time, such as frequency, amplitude, phase, or other characteristic. In an example, the updated time-varying control signal includes an updated pulse-width modulated signal, or updated PWM signal. In an example, an updated PWM signal includes substantially the same duty cycle as the ECU PWM signal, and the updated PWM signal includes a different frequency than the ECU PWM signal. For example, the updated PWM signal can have a frequency that is greater than the ECU duty cycle. In an example, a frequency of an updated PWM signal is at least twice a frequency of the ECU PWM signal.

In an example, the processor circuit 601 can be configured to recognize a deficiency in an ECU PWM signal and provide an updated PWM signal that does not include in the recognized deficiency. For example, if discontinuous portions of an ECU PWM signal are received, then the processor circuit 601 can interpolate information between the discontinuous portions and provide a continuous updated PWM signal. In an example, an ECU PWM signal can include transients or other significant aberrations or changes in a signal that are unsuitable for a given turbocharger assembly to implement. The processor circuit 601 can recognize such transients or other signal changes and then provide a smoothed, or otherwise processed, updated PWM signal to control operation of a turbocharger solenoid valve.

In the example of FIG. 6, an output of the processor circuit 601 can be used to supply an updated PWM signal to a solenoid for a turbocharger. Although the example of FIG. 6 shows the processor circuit 601 as coupled to the three-port solenoid valve 410, the processor circuit 610 can be similarly used to provide the updated PWM signal to a two-port solenoid.

In an example, the processor circuit 601 receives, from the ECU 602, a PWM signal that is intended to be provided to a solenoid in a turbocharger. In other examples, the processor circuit 601 receives one or more other signals from the ECU 602, or from other vehicle circuitry, that is intended to be used other than by a solenoid in a turbocharger. The processor circuit 601 can receive and interpret the one or more other signals and, in response, generate an updated control signal, such as an updated PWM signal for use in controlling a turbocharger solenoid. For example, the processor circuit 601 can be configured to receive control information about a purge solenoid or purge valve from the ECU 602, and to use the purge solenoid information in generating the updated PWM signal for use in controlling the turbocharger solenoid. The processor circuit 601 can similarly use information received from one or more sensors (e.g., acceleration, temperature, pressure, etc.) to generate or to update the PWM signal.

In an example, a device other than a solenoid valve can be used to modulate or control gas flow between a compressor-side of a turbocharger system and a wastegate or wastegate actuator. For example, another type of hydraulic valve, such as an orifice valve can be used. Other valves such as slide gates or butterfly valves can similarly be used. In an example, an orifice valve can be placed in series with a wastegate conduit and can serve as a variable orifice to modulate gas flow through the conduit. In an example that includes an orifice valve, the processor circuit 601 can be configured to receive PWM or other information from an ECU and translate the PWM or other information into a signal to control the orifice valve (e.g., a DC signal having a variable amplitude). That is, the processor circuit 601 can be configured to receive duty cycle and/or signal frequency or other information from an ECU and, in response, the processor circuit 601 can generate a position signal configured to instruct substantially any type of hydraulic valve to attain or maintain a specified relative opened or closed state, such as to modulate a wastegate response to pressure changes in a turbocharger compressor.

Figure 7:
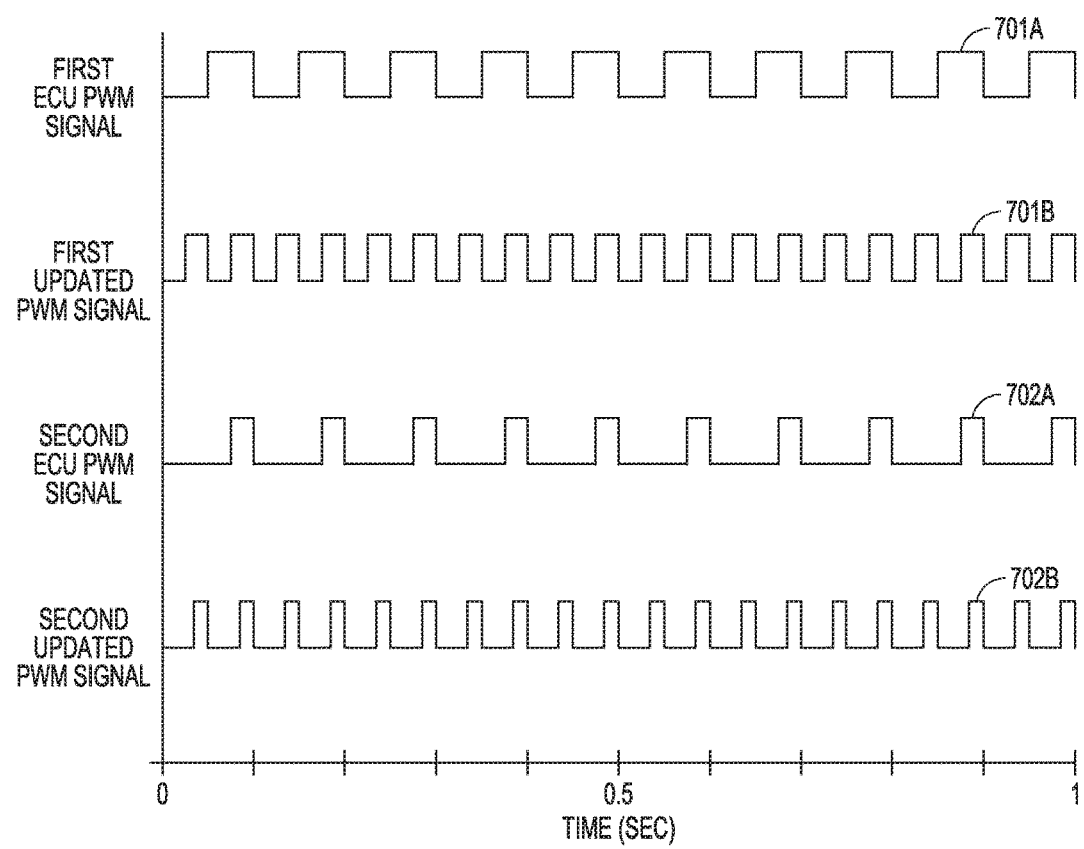
FIG. 7 illustrates generally an example of multiple ECU PWM signals and corresponding multiple updated PWM signals, such as can be updated using a processor circuit.

FIG. 7 illustrates generally an example of multiple ECU PWM signals and corresponding multiple updated PWM signals, such as can be updated using the processor circuit 601. In an example, a frequency of a first ECU PWM signal 701A is about 10 Hz, and a frequency of a first updated PWM signal 701B is about 20 Hz. In an example, the first updated PWM signal 701B has substantially the same duty cycle as the duty cycle of the first ECU PWM signal 701A. For example, the first ECU PWM signal 701A is a 10 Hz signal with a 50% duty cycle, and the first updated PWM signal 701B is a 20 Hz signal with a 50% duty cycle. In the example of FIG. 7, the second ECU PWM signal 702A is about 10 Hz and has a duty cycle of 25%. The second updated PWM signal 702B is a 20 Hz signal with a 25% duty cycle.

A time-varying control signal, such as an updated PWM signal that is generated by the processor circuit 601, can be provided by the processor circuit 601 to a solenoid in a turbocharger system (see, e.g., the example of FIG. 6). In response to the updated PWM signal, the solenoid can be cycled between opened and closed positions. Using the updated PWM signal (e.g., at 20 Hz), the solenoid can be cycled at a rate that is at least twice the rate at which the solenoid would otherwise be cycled by the ECU PWM signal (e.g., at 10 Hz). Because the updated PWM signal and the ECU PWM signal have substantially the same duty cycle, a total amount of time that the solenoid dwells in any one position, given a steady state input from an ECU, can be substantially the same for both the ECU PWM signal and the updated PWM signal.

Figure 8A:
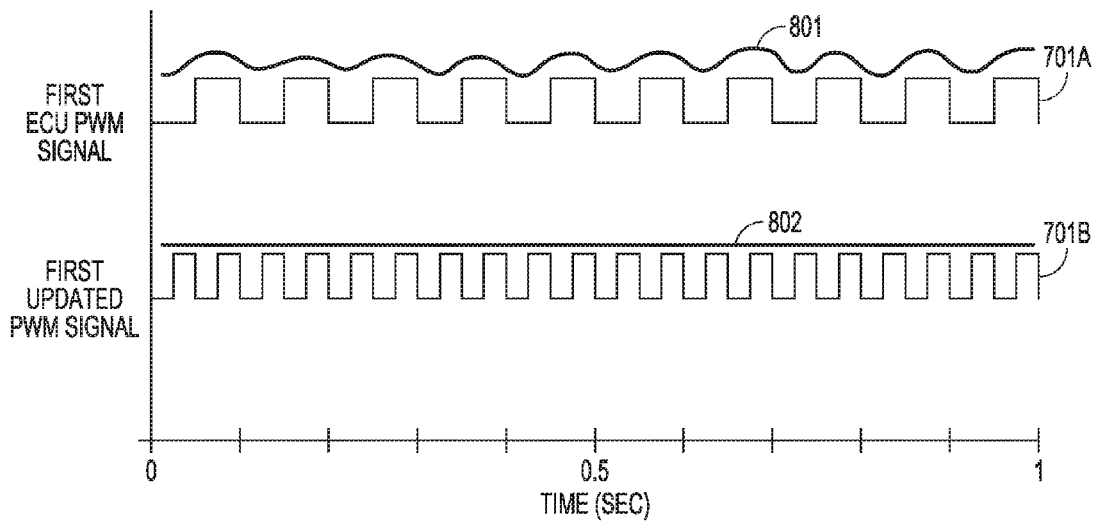
FIG. 8A illustrates a first ECU PWM signal and a first updated PWM signal with corresponding respective boost pressure curves.

FIG. 8A illustrates the first ECU PWM signal 701A and the first updated PWM signal 701B from FIG. 7, together with corresponding boost pressure curves 801 and 802, respectively. The boost pressure curve represents an actual or approximate pressure in a compressor chamber, such as corresponding in time with the illustrated respective PWM signals. The boost or compressor chamber pressure can be defined at least in part by an OEM ECU, for example, based on multiple sensed operating characteristics, such as a throttle position or engine load.

In the example of FIG. 8A, a first boost pressure curve 801 represents a pressure of the compressor chamber (e.g., the compressor 401) over time. The pressure is due in part to a turbocharger solenoid valve operating according to instructions from an OEM ECU, such as the ECU 602 in the example of FIG. 6. For example, the OEM ECU can generate the first ECU PWM signal 701A, and the first ECU PWM signal 701A can be used by the turbocharger's solenoid to provide a desired or specified amount of boost. If the ECU operates at a low frequency, such as 10 Hz, then the solenoid position, or opened/closed status of the solenoid, is updated 10 times per second. For example, the first boost pressure curve 801 shows that the boost pressure can fluctuate over the illustrated interval, generally following the square wave of the first ECU PWM signal 701A.

Several issues can result from a solenoid insufficiently tracking transients in a desired boost curve. First, under control of an OEM ECU PWM signal, the compressor chamber pressure can lag behind a request for boost, and as a result, the engine's performance lags. Second, wastegate flutter can result because the wastegate actuator has more time between solenoid state changes to fully open or close the wastegate door. That is, under the OEM ECU PWM signal, the wastegate door is controlled in a relatively coarse manner such that there can be long intervals between wastegate actuator state changes.

In an example, compressor chamber pressure lags a boost request from an ECU. For example, if a call for additional boost (e.g., due to a throttle position change) is made by an ECU just after a clock signal pulse, then the call will not be recognized until a later subsequent clock cycle. In an example that includes a 10 Hz ECU, a clock cycle begins at time 0, and a request for boost is made at time 0.01 seconds. The call will not be implemented by the solenoid until after the instruction is received at time 0.1 seconds when the next clock cycle occurs. At time 0.1 seconds, such as 0.09 seconds after the request was issued, the solenoid control signal can be sent to and received at the solenoid. The solenoid can in turn actuate or open to shunt boost pressure away from the wastegate actuator, and the boost or compressor chamber pressure can increase.

In an example that includes a processor circuit that operates at a higher clock speed than the ECU, such as the processor circuit 601, a resulting boost characteristic can be more closely matched with a desired boost characteristic. For example, in FIG. 8A, the first updated PWM signal 701B can have substantially the same duty cycle as the first ECU PWM signal 701A (e.g., about 50% duty cycle) but can have a higher frequency, such as twice the frequency of the first ECU PWM signal 701A. A second boost pressure curve 802 represents a compressor chamber pressure over time when the solenoid is operated according to the first updated PWM signal 701B. The second boost pressure curve 802 is substantially smoother than the first boost pressure curve 801 as a result of the more frequent pulses in the first updated PWM signal 701B. That is, the compressor chamber's pressure can be held steadier using the higher frequency first updated PWM signal 701B as compared to using the first ECU PWM signal 701A as a solenoid control signal.

Figure 8B:
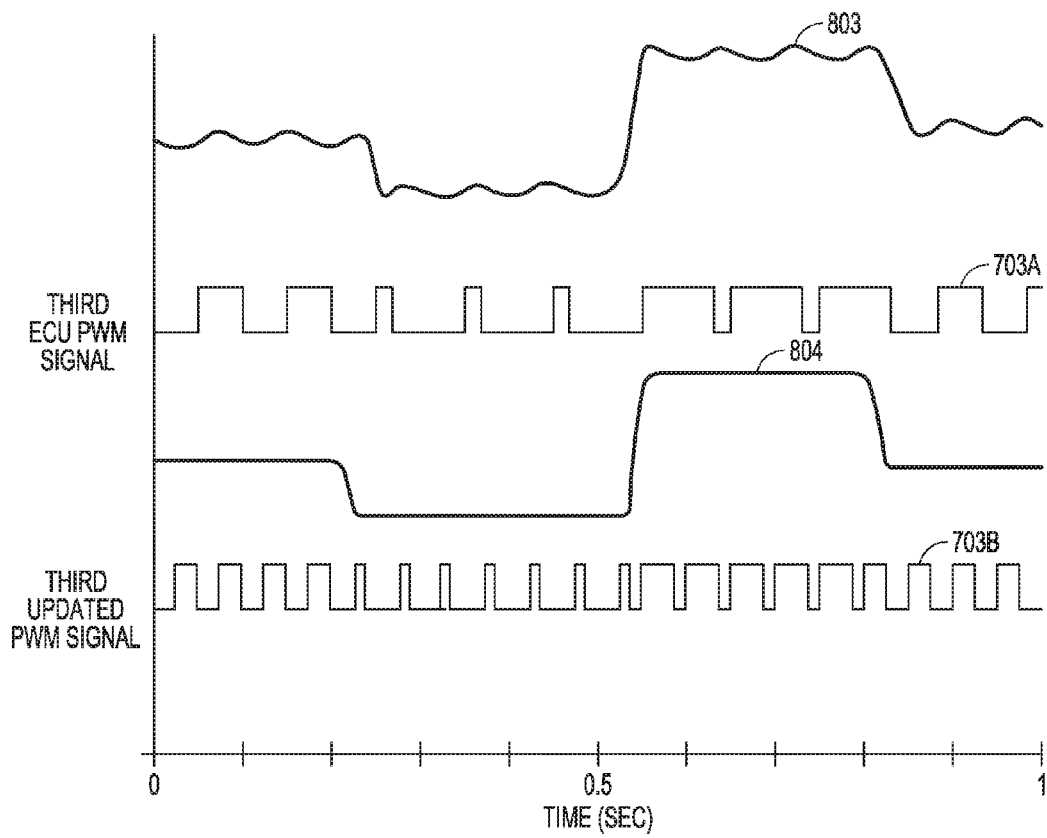
FIG. 8B illustrates a second ECU PWM signal and a second updated PWM signal with corresponding respective boost pressure curves.

FIG. 8B illustrates generally another example of multiple PWM signals and corresponding compressor chamber boost pressures. A third ECU PWM signal 703A includes a variable PWM signal at a first frequency, and a third updated PWM signal 703B includes a variable PWM signal at a second frequency that is greater than the first frequency. The duty cycle of the third ECU PWM signal 703A and the duty cycle of the third updated PWM signal 703B are substantially the same over the illustrated interval. For example, in the illustrated portion, the third ECU PWM signal 703A includes, at the first frequency, two cycles at a first duty cycle, three cycles at a second duty cycle, three cycles at a third duty cycle, and so on. The third updated PWM signal 703B includes, at the higher second frequency, four cycles at the same first duty cycle, approximately six cycles at the same second duty cycle, approximately six cycles at the same third duty cycle, and so on. The number of cycles at each duty cycle at the higher second frequency does not necessarily correspond to exactly twice the number of cycles as at the first frequency because the third updated PWM signal 703B can be used to more closely track transients or changes in a target boost pressure. Therefore, over intervals of the first frequency that include a transient, the third updated PWM signal 703B may have an extra cycle or portion of a cycle, depending upon when the transient occurs relative to the duty cycle interval.

In the example of FIG. 8B, a third boost pressure curve 803 corresponds to the third ECU PWM signal 703A. That is, the third boost pressure curve 803 represents a compressor chamber pressure as a result of the turbocharger system's solenoid being controlled based on the third ECU PWM signal 703A. The third boost pressure curve 803 shows that the boost pressure fluctuates over the illustrated interval, substantially following the square wave of the first ECU PWM signal 703A. FIG. 8B also includes a fourth boost pressure curve 804 that corresponds to the third updated PWM signal 703B. That is, the fourth boost pressure curve 804 represents a compressor chamber pressure as a result of the turbocharger system's solenoid being controlled based on the third updated PWM signal 703B. The fourth boost pressure curve 804 fluctuates substantially less than the third boost pressure curve 803 over the illustrated interval because of the higher frequency of the third updated PWM signal 703B, and the duty cycle of the third ECU PWM signal 703A and the duty cycle of the third updated PWM signal 703B are substantially the same.

In an example, variations in boost pressure can be mechanically damped. Mechanical damping can be applied independently of, or in coordination with, boost pressure modulation provided by the various pneumatic or hydraulic valves, ECU PWM signals, and updated PWM signals discussed herein. In an example, a pneumatic accumulator can be provided in fluid communication with one or more of a turbocharger compressor, wastegate actuator, or wastegate conduit. A pneumatic accumulator can be used to receive and store energy from a turbocharger compressor, or can be used to damp variations or transients in boost pressure, such as received at a wastegate actuator. In an example, an accumulator can cushion hammer effects in pneumatic systems, such as by reducing shocks caused by rapid operation or sudden starting and stopping of various elements in a pneumatic system. Various types of pneumatic accumulators can be used to provide mechanical damping of a boost pressure signals, such as weight-loaded piston type, diaphragm or bladder type, spring type, or hydro-pneumatic piston type.

Figure 9:
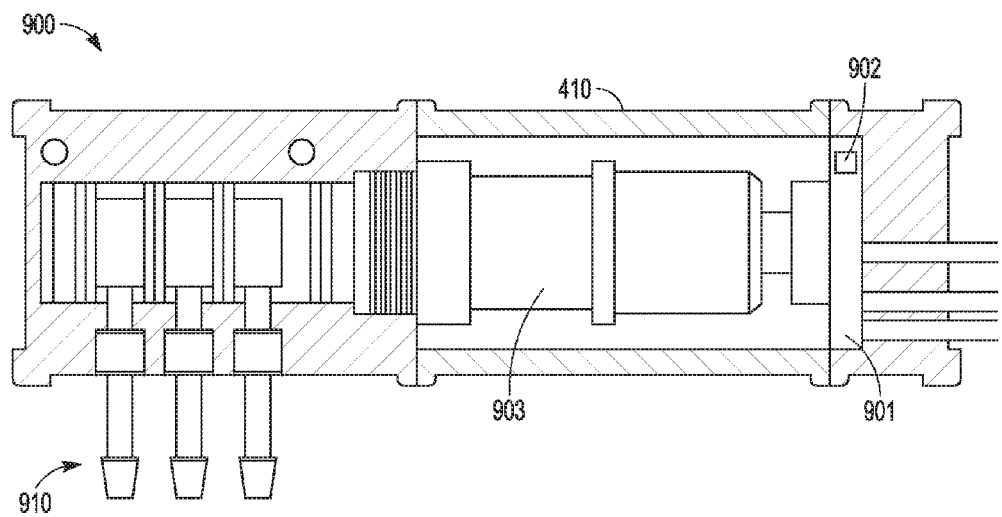
FIG. 9 illustrates generally a partial section view of a turbocharger control system.
Figure 10:
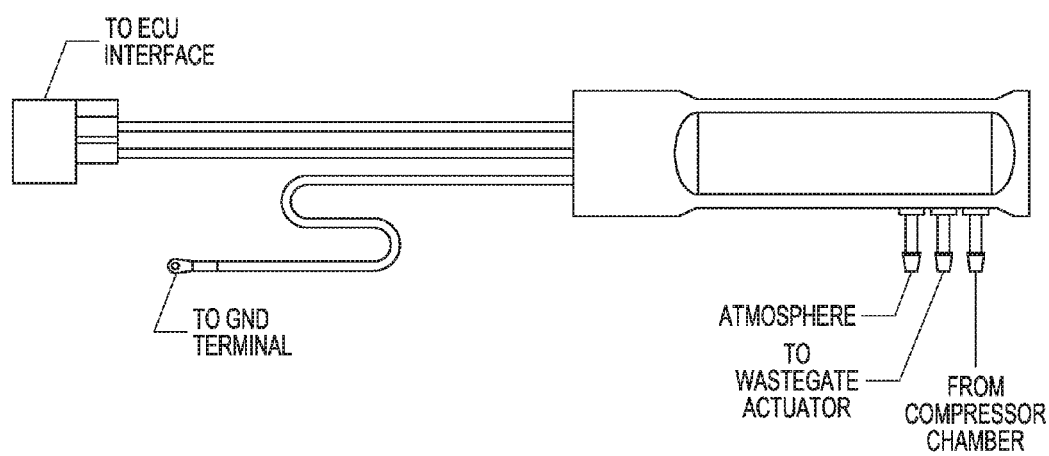
FIG. 10 illustrates a profile or side view of an example of a turbocharger control system.

In an example, a processor circuit that can provide or generate the updated PWM signal, such as based on the ECU PWM signal, is included in a portion of a system that is configured to be placed in-line between an on-board ECU (e.g., an OEM ECU) and a solenoid in a turbocharger, for example as illustrated schematically in FIG. 6. FIG. 9 illustrates generally a partial section view of a turbocharger control system 900 that includes a solenoid 903 of the three-port solenoid valve 410, the processor circuit 601 on a circuit board 901, and multiple ports 910. FIG. 10 illustrates a profile or side view of the turbocharger control system 900. The system includes a first port configured to be coupled with an ECU (e.g., the ECU 602), a second port configured to be coupled with a ground terminal, and the multiple ports 910 configured to be respectively coupled to a turbocharger compressor chamber, a wastegate actuator, and an atmosphere inlet.

By increasing the frequency of a PWM signal, a boost or compressor chamber pressure can be controlled more accurately than would otherwise be possible using an OEM ECU PWM signal at a lower frequency. In the examples above, the compressor chamber pressure lags behind a request for boost, such as depending upon when during a cycle a boost request is made. In the example of an ECU operating at 10 Hz, a call for boost that is made at time 0.01 seconds is not implemented by the solenoid until after the instruction is received at the following clock cycle, such as at time 0.1 seconds. However, if the solenoid receives an updated, higher frequency PWM signal, such as from the processor circuit operating at 20 Hz, then the boost or compressor chamber pressure lag time can be reduced. At 20 Hz, a call for boost that is made at time 0.01 seconds can be implemented at time 0.05, or 50 milliseconds sooner than it would have been otherwise implemented under the 10 Hz ECU PWM signal.

Similarly to a call for additional boost, unwanted boost pressure in the turbine chamber can be more timely discharged using an updated or higher frequency PWM signal. If a turbine chamber pressure is to be quickly discharged, for example using a wastegate, then a solenoid can be switched off, allowing exhaust gas to reach a wastegate actuator, and thereby opening the wastegate door in the turbine chamber. When a call for reduced pressure is made, the solenoid can implement the request at the beginning of the next clock cycle. Because the cycle length is reduced in the higher frequency updated PWM signal, a time from the reduced pressure call to implementation at the solenoid can be reduced.

Another reason to increase the frequency of the ECU PWM signal, such as using the updated PWM signal as described above, includes reducing wastegate flutter. Wastegate flutter is also known as wastegate chatter, or wastegate oscillation. Wastegate flutter can occur under partial-boost conditions, such as can be a result of maintaining a throttle in an intermediate or slightly open position, or near a boost threshold. Wastegate flutter can be caused by rapid opening and closing of a wastegate door, such as at boost levels that are at or near a wastegate's spring pressure. A quick fix to wastegate flutter can be to pre-load the wastegate actuator, such as by shortening the wastegate actuator arm. Although this quick fix can slightly change the conditions under which flutter occurs, it may not be a solution to the flutter issue.

Increasing a frequency of a PWM signal to control a solenoid in the turbocharger system can improve or fix wastegate flutter issues. For example, when a compressor chamber pressure fluctuates at or near the wastegate pressure threshold, the solenoid can be repeatedly actuated and relaxed, such as at the frequency of the PWM signal. If the compressor chamber pressure is more tightly controlled, such as using an updated PWM signal as described herein, the wastegate door can be fully opened or fully closed less frequently.

In some examples, a solenoid can operate in an intermediate position. In an intermediate position, some of the boost energy can be bled off. At higher switching frequencies, an intermediate position can be useful to more accurately modulate wastegate door behavior, such as at or near the wastegate actuator pressure threshold.

Figure 11:
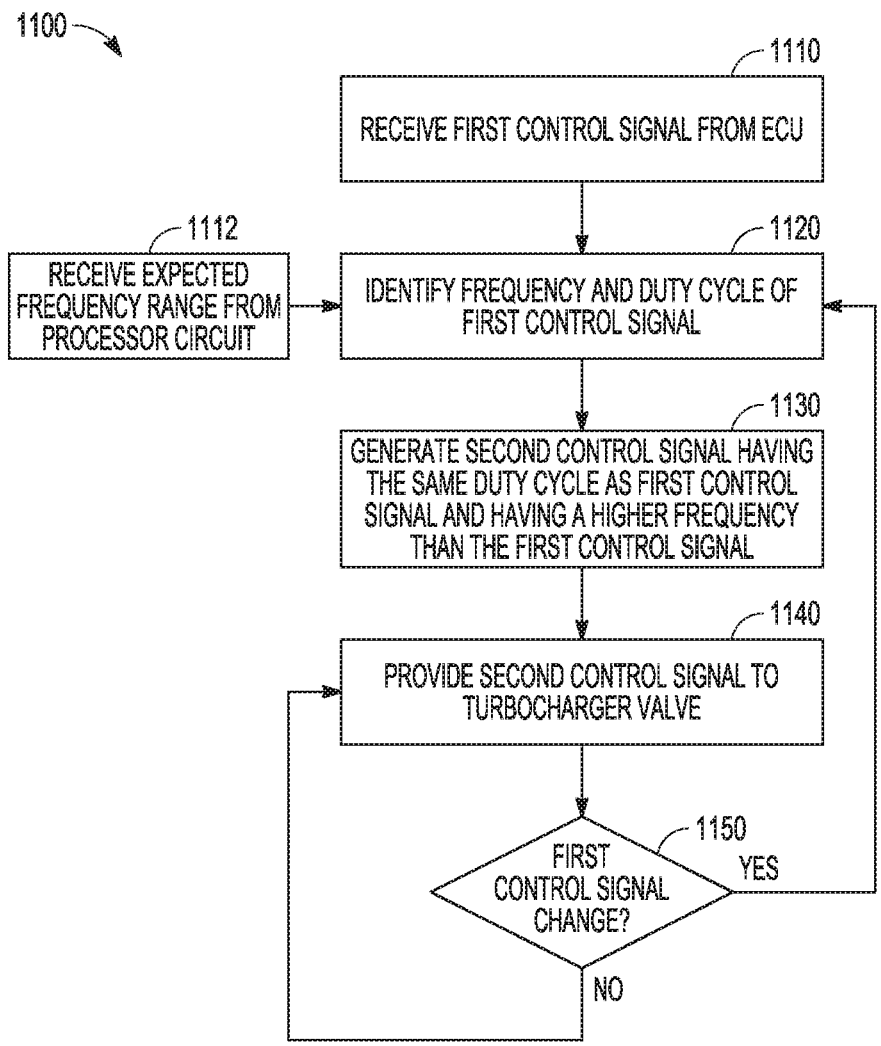
FIG. 11 illustrates generally an example of a method that includes generating a control signal based on an ECU signal.

FIG. 11 illustrates generally an example of a method that can include generating a control signal for a control valve in a turbocharger system, such as for operating a wastegate in one or more of the systems illustrated at FIGS. 2-6. At 1110, the method includes receiving a first control signal from an ECU. Optionally, the ECU is an OEM ECU or an aftermarket or replacement ECU. The first control signal can be configured to provide instructions to a solenoid or other control valve in a turbocharger to modify a boost characteristic of the turbocharger. The first control signal can have various signal characteristics, such as an amplitude, a frequency, a waveform morphology, or a duty cycle. In an example, the first control signal is received by a processor circuit in a boost controller for a turbocharger.

At 1120, the method includes identifying one or more characteristics of the first control signal. For example, the method can include identifying a first frequency of the first control signal, and the method can include identifying a first duty cycle of the first control signal, such as using a processor circuit. At 1112, the method can optionally include receiving expected frequency range information, such as using the processor circuit. By narrowing a frequency search window, the time for the processor circuit to identify the frequency, duty cycle, or other characteristic of the first control signal can be reduced.

At 1130, the method includes generating a second control signal based on one or more characteristics of the first control signal. For example, the second control signal can have substantially the same duty cycle as the first duty cycle corresponding to the first control signal. In an example, the second control signal has a second frequency. The second frequency can be greater than the first frequency of the first control signal. In an example, the second frequency is at least twice the frequency of the first control signal. In an example, the second frequency is at least 20 Hz.

At 1140, the method includes providing the generated second signal to a turbocharger valve. Providing the second signal can include using an electrical conductor to communicate the second signal from the processor circuit to an input terminal of a two-port or three-port solenoid. The solenoid can modulate communication between a compressor side of the turbocharger and a wastegate actuator.

At 1150, the method includes determining whether the first control signal from the ECU has changed. For example, in response to different conditions (e.g., a throttle position, an air temperature or air pressure, etc.), the ECU can update the control signal to change a boost request from the turbocharger. If the first control signal has changed, then the example can return to 1120 to identify frequency and duty cycle characteristics of the updated control signal from the ECU. If the first control signal is unchanged, then the same second control signal can be provided to the turbocharger valve at 1140.

In an alternative example to generating a second control signal having a higher frequency than the first control signal, such as at 1130, an example can include generating a second control signal such as a DC control signal, such as having a variable signal amplitude characteristic. The DC control signal can be received by an actuator, such as a linear or orifice valve, and used to update or modulate an opened/closed state or status characteristic of the actuator.

Figure 12:
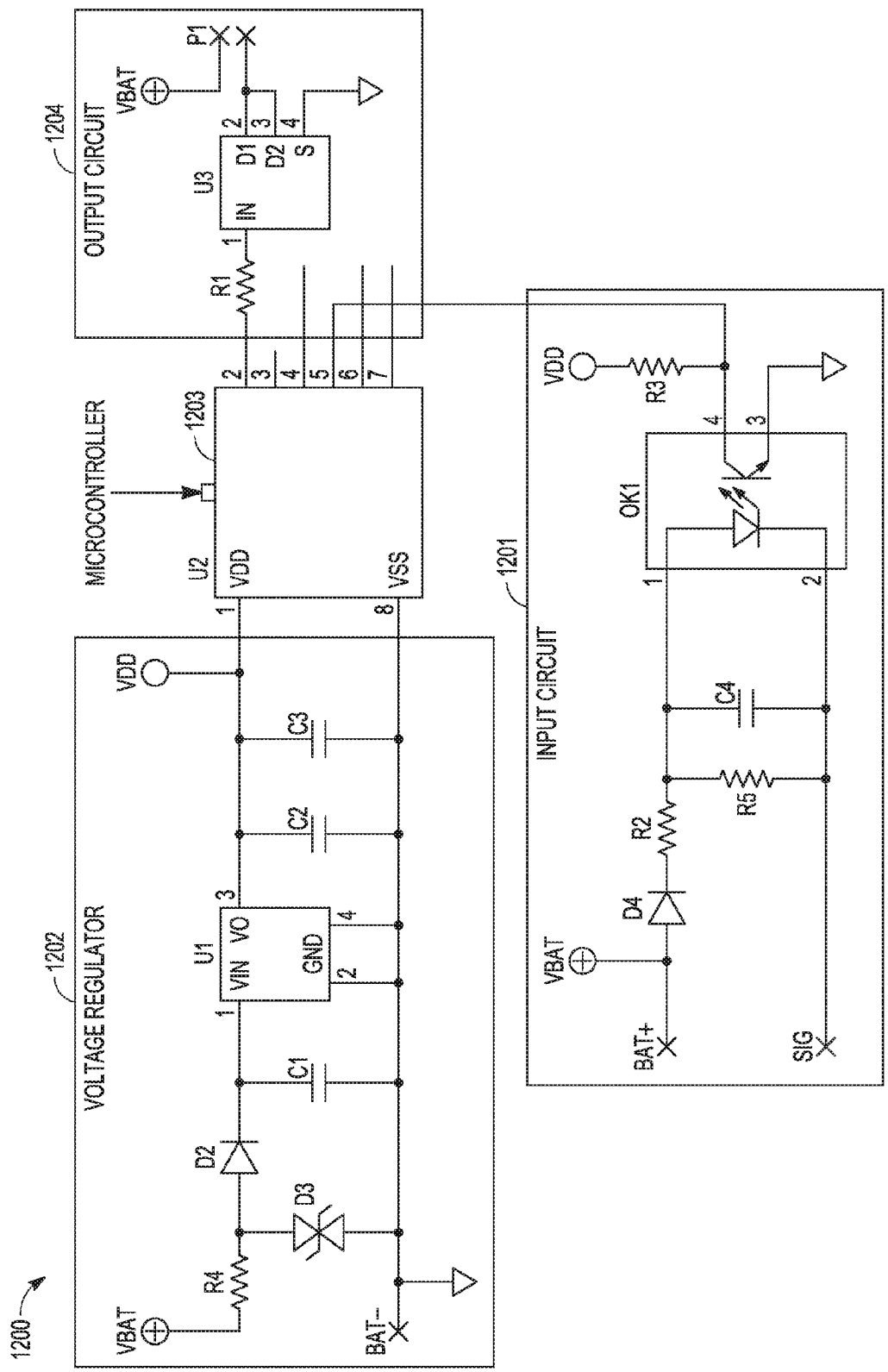
FIG. 12 illustrates generally a schematic diagram of an example of a turbocharger boost controller.

FIG. 12 illustrates generally an example of a multiple stage boost controller for a turbocharger system. The boost controller includes multiple interfaces, including a voltage regulator 1202 configured to receive a power signal, a microcontroller or processor circuit 1203, an input circuit 1201 configured to receive a time-varying control signal, such as a PWM signal from an ECU, and an output circuit 1204, such as configured to provide a different time-varying control signal (e.g., a higher-frequency PWM signal) to control a valve in a turbocharger system. The input circuit 1201 optionally includes an optocoupler that is configured to receive an electrical ECU signal and, in response, provide information about the electrical ECU signal to the microcontroller. The voltage regulator 1202 can include, among other things, a linear regulator circuit to provide a substantially constant voltage signal at the microcontroller or processor circuit 1203. The output circuit 1204 can include a FET or other power output device that provides a time-varying control signal, such as a PWM signal, such as the updated PWM signals of, e.g., FIGS. 7 through 8B, or the second control signal generated at operation 1130 of FIG. 11. In an example, a power capacitor can be included and the switched ground can be removed. In an example, the microcontroller can be replaced by an analog circuit that similarly receives an electrical ECU signal at a first frequency and up-converts the signal to a higher frequency updated PWM signal.

Notes

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for controlling a boost-control valve in a turbocharger system for a vehicle, the method comprising:
   receiving a first control signal at a data input of a control circuit, the first control signal including information about a target power boost for an engine of the vehicle; and
   generating a second control signal using the control circuit, the generating including:
   identifying a first duty cycle of the first control signal;
   identifying a first frequency of the first control signal;
   selecting a second duty cycle for the second control signal based on the identified first duty cycle;
   selecting a second frequency for the second control signal based on the identified first frequency; and
   providing the second control signal to the boost-control valve in the turbocharger system to actuate the boost-control valve between opened and closed positions according to the second control signal and the second duty cycle;
   wherein the second frequency for the second control signal is greater than the first frequency of the first control signal.

2. The method of claim 1, wherein the receiving the first control signal includes receiving the first control signal from an engine control unit of the vehicle.

3. The method of claim 1, wherein the selecting the second duty cycle for the second control signal includes selecting substantially the same first duty cycle for use in the second control signal.

4. The method of claim 1, wherein the second frequency for the second control signal is at least twice the first frequency of the first control signal.

5. The method of claim 1, further comprising:
   receiving the second control signal at the boost-control valve in the turbocharger system; and
   based on the second duty cycle, using the boost-control valve to modulate a pressure signal provided from a compressor side of the turbocharger to a wastegate actuator of the turbocharger, wherein the using the boost-control valve to modulate the pressure signal includes inhibiting at least a portion of a pressure signal from the compressor side from reaching the wastegate actuator.

6. The method of claim 1, wherein the receiving the first control signal includes receiving information about a target boost pressure for a compressor side of the turbocharger or for a turbine side of the turbocharger.

7. The method of claim 1, wherein the generating the second control signal includes generating the second control signal having a different waveform morphology characteristic than a corresponding waveform morphology characteristic of the first control signal.

8. A method for controlling a turbocharger, the method comprising:
- receiving information indicative of a target air/fuel mixture for use in an internal combustion engine, the internal combustion engine being controlled at least in part by an engine control unit circuit;
- generating, using a processor circuit external to the engine control unit circuit, a control signal that is based on the information indicative of the target air/fuel mixture; and
- providing the generated control signal to a boost pressure modulator in a turbocharger system, the boost pressure modulator configured to selectively enable or inhibit communication of at least a portion of a boost pressure signal to a wastegate actuator in the turbocharger;
- wherein the control signal generated by the processor circuit has a frequency that is other than an operating frequency of the engine control unit circuit.

9. The method of claim 8, wherein the generating the control signal that is based on the information indicative of the target air/fuel mixture includes generating a control signal that has a frequency that is greater than the operating frequency of the engine control unit circuit; and wherein the providing the generated control signal to a boost pressure modulator includes providing the generated control signal to a solenoid valve to selectively shunt the boost pressure signal from the wastegate actuator.

10. The method of claim 8, wherein the generating the control signal that is based on the information indicative of the target air/fuel mixture includes generating a DC control signal that has a fixed or variable amplitude, and wherein the providing the generated control signal to a boost pressure modulator includes providing the generated control signal to an orifice valve that is configured to modulate gas communication between a compressor side of the turbocharger and the wastegate actuator.

11. A system, comprising:
- a boost controller for controlling boost pressure in a turbocharger, the boost controller including:
  - a processor circuit configured to generate a control valve PWM signal based on an electrical signal from an engine control unit of a vehicle that includes the turbocharger;
  - a first input interface coupled with the processor circuit and configured to receive the electrical signal from the engine control unit;
  - a second input interface configured to receive a boost signal from a compressor in the turbocharger; and
  - an output interface configured to provide a wastegate control signal for a wastegate assembly in the turbocharger, the wastegate control signal including at least a portion of the boost signal from the compressor;
- wherein the boost controller uses the control valve PWM signal generated by the processor circuit to modulate the wastegate control signal.

12. The system of claim 11, wherein the boost controller includes a solenoid valve that modulates communication between the second input interface and the output interface according to instructions from the processor circuit.

13. The system of claim 12, wherein the processor circuit is configured to operate the solenoid valve at a frequency that is greater than a frequency of the electrical signal received from the engine control unit.

14. The system of claim 13, wherein the processor circuit is configured to operate the solenoid valve at a duty cycle that corresponds to a duty cycle of the electrical signal received from the engine control unit.

15. The system of claim 11, wherein the processor circuit is configured to:
- determine a first frequency of the electrical signal received from the engine control unit at the first input interface;
- determine a first duty cycle of the electrical signal received from the engine control unit at the first input interface; and
- generate the control valve PWM signal, including (1) a duty cycle that is substantially the same as the first duty cycle and (2) a second frequency that is greater than the first frequency.

16. A system for updating a boost characteristic of a turbocharger for an internal combustion engine of a vehicle, the engine being at least partially controlled by instructions provided by an engine control unit (ECU) of the vehicle, the system comprising:
- a processor circuit, coupled to the ECU of the vehicle, wherein the processor circuit is configured to:
- determine a first frequency characteristic of a first signal from the vehicle's ECU;
- determine a first duty cycle characteristic of the first signal from the vehicle's ECU; and
- using information about the determined first frequency characteristic and determined first duty cycle characteristic, provide a pulse-width modulated control signal to a valve actuator, the valve actuator configured to operate a valve that controls fluid communication between a compressor side of the turbocharger and a wastegate actuator of the turbocharger;
- wherein the pulse-width modulated control signal has substantially the same first duty cycle characteristic as the first signal from the vehicle's ECU; and
- wherein the pulse-width modulated control signal has a different higher frequency characteristic than the first frequency characteristic of the first signal from the vehicle's ECU.

17. The system of claim 16 further comprising the valve actuator, the valve actuator including a solenoid valve that is switchable between at least partially-opened and closed positions based on a duty cycle of the pulse-width modulated control signal.

18. The system of claim 17, wherein the solenoid valve includes a two-port solenoid valve, wherein a first port of the solenoid valve is configured to receive a gas pressure signal from the compressor side of the turbocharger; and wherein a second port of the solenoid valve is configured to selectively discharge the received gas pressure signal based on the pulse-width modulated control signal.

19. The system of claim 17, wherein the solenoid valve includes a three-port solenoid valve, wherein a first port of the solenoid valve is configured to receive a gas pressure signal from the compressor side of the turbocharger, wherein a second port of the solenoid valve is in fluid communication with the wastegate actuator, and wherein a third port of the solenoid valve is configured to selectively discharge pressure from the wastegate actuator based on the pulse-width modulated control signal.

* * * * *